Nov. 27, 1934.    R. CARPENTER    1,982,370
STOCK CONSISTENCY INDICATING AND REGULATING APPARATUS
FOR PULP AND PAPER MAKING MACHINES
Filed June 26, 1933    4 Sheets-Sheet 1

INVENTOR
RUSSELL CARPENTER
BY J.F.O'Connell
ATTORNEY

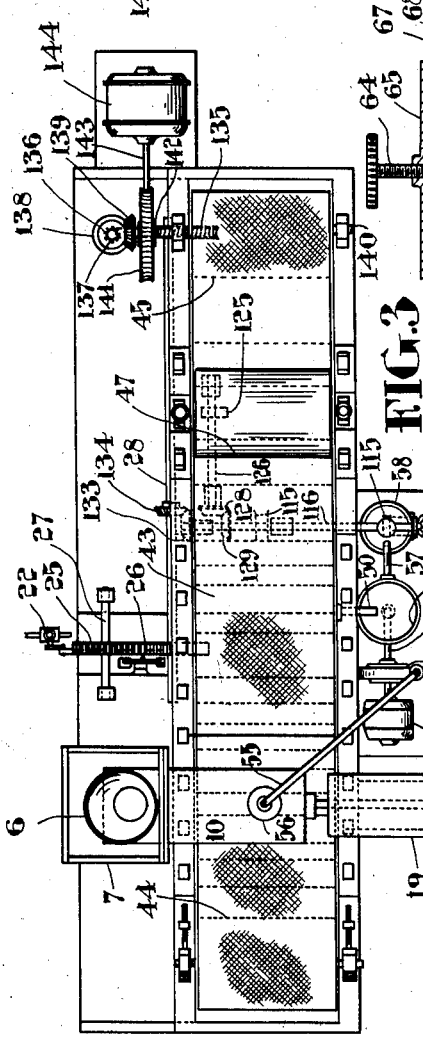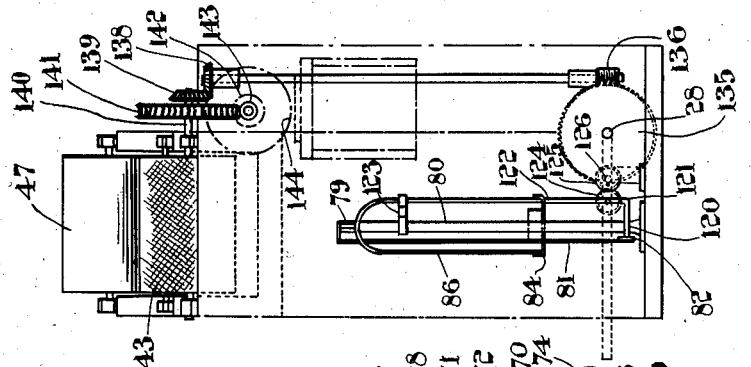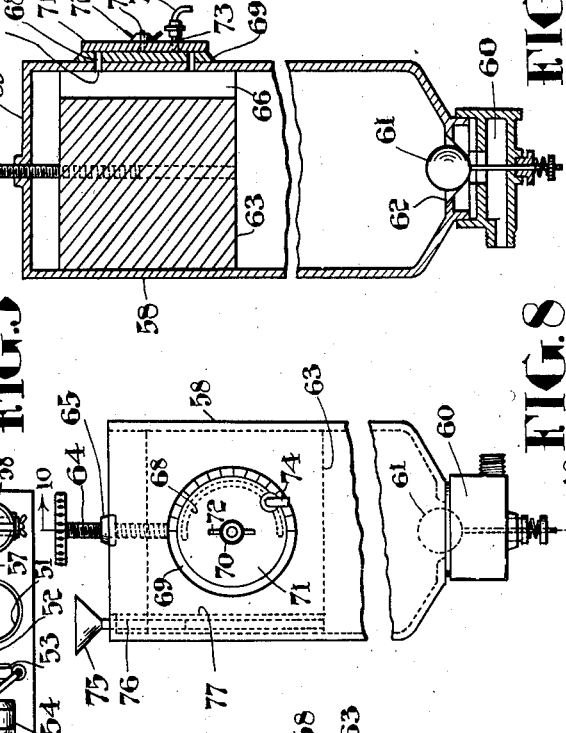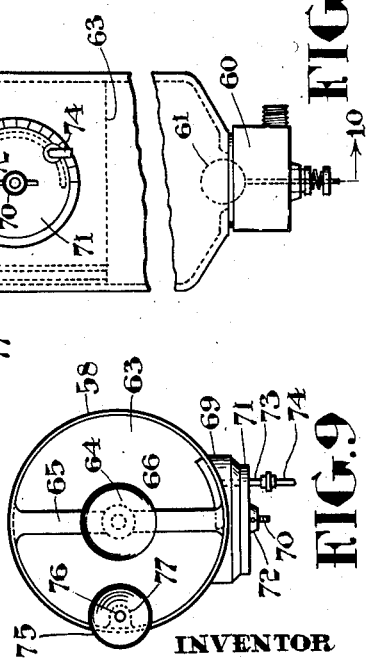

Nov. 27, 1934.   R. CARPENTER   1,982,370
STOCK CONSISTENCY INDICATING AND REGULATING APPARATUS
FOR PULP AND PAPER MAKING MACHINES
Filed June 26, 1933   4 Sheets-Sheet 3
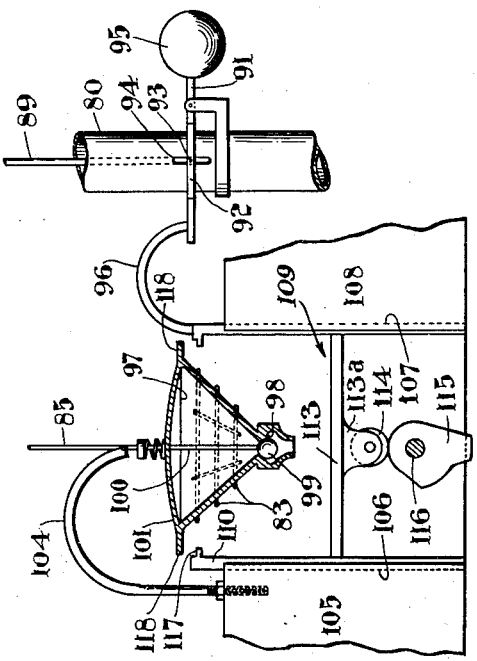
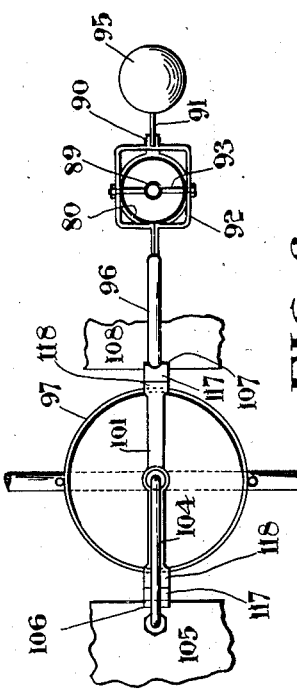
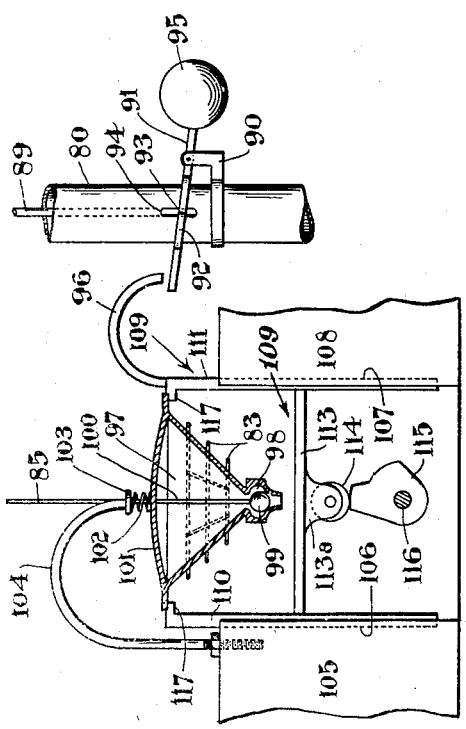
INVENTOR
RUSSELL CARPENTER
BY J. S. O'Connell
ATTORNEY

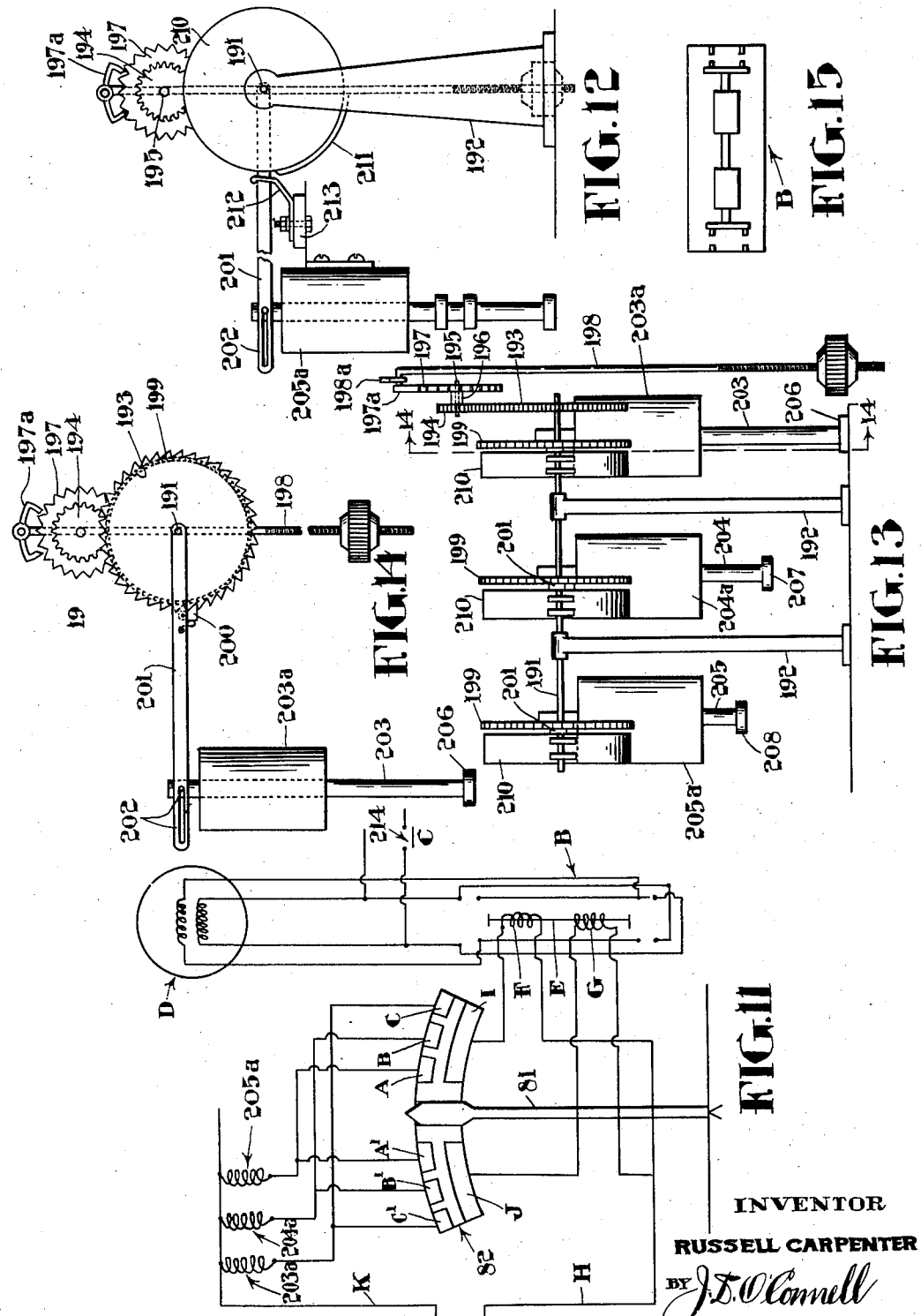

Patented Nov. 27, 1934

1,982,370

UNITED STATES PATENT OFFICE 1,982,370

STOCK CONSISTENCY INDICATING AND REGULATING APPARATUS FOR PULP AND PAPER MAKING MACHINES

Russell Carpenter, Wayagamack Island, Three Rivers, Quebec, Canada

Application June 26, 1933, Serial No. 677,556

11 Claims. (Cl. 92—46)

This invention relates to apparatus for indicating and correcting undesirable variations in the consistency of the pulp stock supplied to a pulp or paper making machine and the object is to provide an improved apparatus that is sensitive to very slight changes in the stock consistency.

Generally stated, the invention consists in periodically extracting samples of constant volume from the main body of diluted stock; separating the liquid from the fibrous constituents of the samples so that the quantity of liquid thus derived from each sample depends on its total liquid content which is predetermined by the consistency of the stock at the time the sample is taken; delivering liquid from each sample to a weighing apparatus so that the exact quantity of liquid received by the weighing apparatus from any particular sample is a variable factor dependent upon the total quantity of liquid derived from such sample; and counterweighting the weighing apparatus to just balance the weight of the liquid received from a sample taken at a time when the consistency of the main body of stock is at the desired value. These sample extracting, liquid separating, and liquid weighing operations are so carried out that the weight of the liquid from any particular sample as indicated by the weighing apparatus bears a definite relation to the consistency of the stock at the time the sample is taken. The movement of the weighing apparatus, which occurs when the weight of the sample liquid delivered thereto exceeds or is less than the balancing weight, is utilized for regulating the water supply valve to correct the undesirable increase or decrease in the stock consistency indicated by this movement of the weighing apparatus.

Proceeding now to a more detail description of the invention reference will be had to the accompanying drawings, in which Fig. 1 is a side view of the apparatus provided in accordance with this invention. In this view portions of the frame structure are indicated by dotted lines and certain elements, appearing in other figures, are omitted to expose other elements that would otherwise be concealed.

Fig. 3 is a top plan view of the assembly appearing in Fig. 1.

Fig. 4 is an incomplete end view showing certain elements of the drive gearing and the weighing apparatus but omitting other elements for the sake of clearness.

Fig. 5 is an enlarged detail view, partly in section, of a portion of the weighing mechanism.

Fig. 6 is a top plan view of the construction shown in Fig. 5.

Fig. 7 is a view similar to Fig. 5 but showing certain parts in a different position.

Fig. 8 is a view, in front elevation, of a metering tank which controls the delivery of sample liquid to the weighing apparatus.

Fig. 9 is a top plan view of the tank shown in Fig. 8.

Fig. 10 is a vertical section along the line 10—10 of Fig. 8.

Fig. 11 is a diagrammatic view of an electrical control means associated with the weighing apparatus for automatically correcting undesirable changes in the consistency of the stock.

Fig. 12 is a view, in side elevation, of a drum switching mechanism forming part of the electrical control means.

Fig. 13 is a view, in front elevation, of the drum switching mechanism appearing in Fig. 12.

Fig. 14 is a sectional view along the line 14—14 of Fig. 13.

Fig. 15 is a plan view of a magnetic motor reversing switch forming part of the electrical control mechanism.

Figures 1, 2:
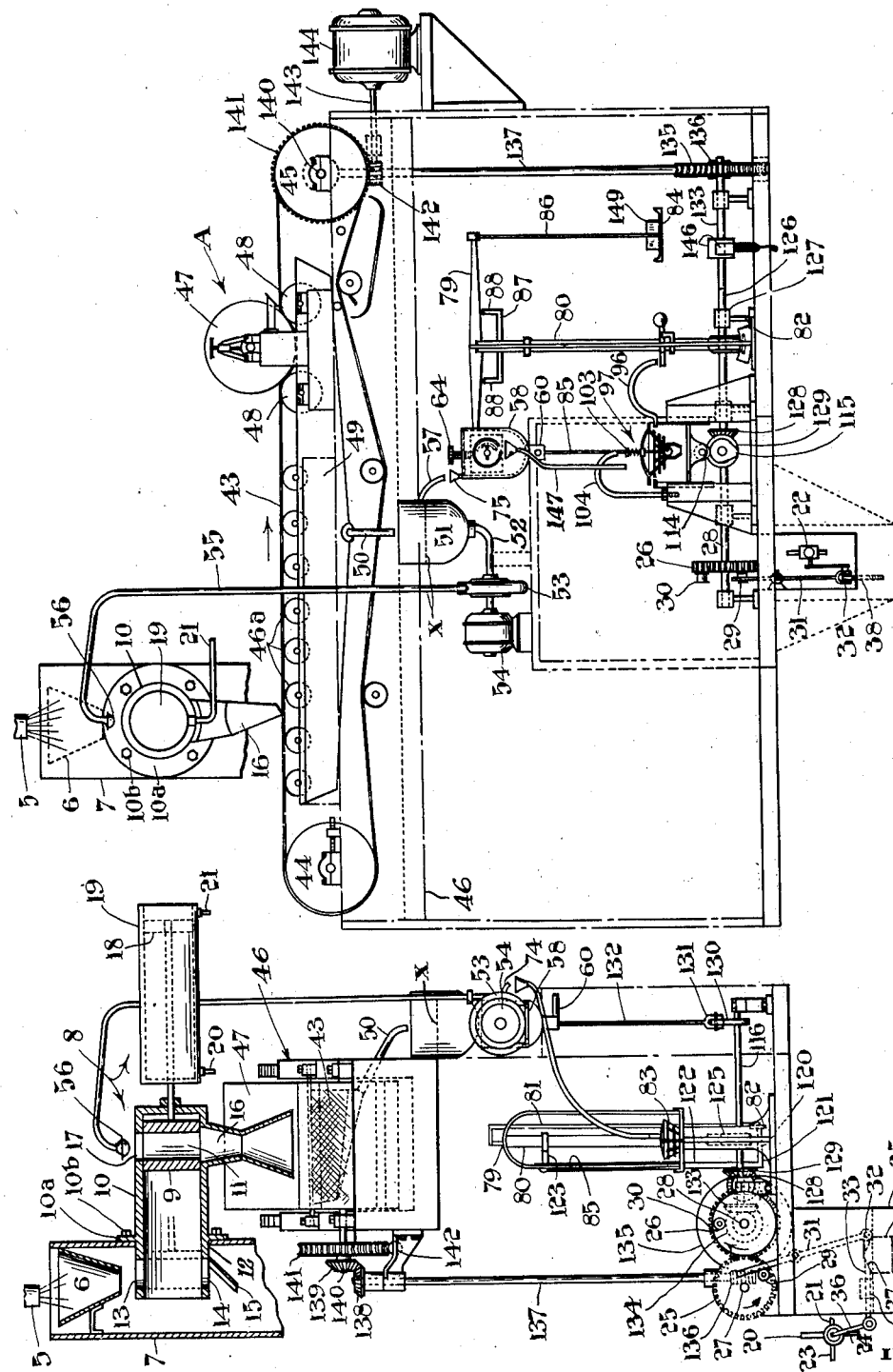
Fig. 2 is a view, partly in end elevation and partly in vertical section, of the apparatus shown in Fig. 1.

Referring more particularly to the drawings, 5 indicates a pipe through which the diluted stock is delivered to a funnel 6 arranged in the upper end of a conduit 7. This conduit leads to the stock chest (not shown) of the pulp or paper making machine.

According to the present invention measured samples of the diluted stock are periodically extracted from the conduit 7 by a sample extractor generally indicated at 8. This extractor includes a plunger 9 working in a cylinder 10 and provided with a vertically extending measuring chamber 11 open at each end. Cylinder 10 is provided with a flange 10a bolted to the conduit 7 as indicated at 10b. One end of the cylinder projects into the interior of the conduit through an opening 12 and is provided with top and bottom openings 13 and 14 in line with the discharge opening of the funnel. Opening 14 is partially obstructed by a baffle 15 so that the effective area of this opening is somewhat less than that of opening 13. Near its opposite end cylinder 10 is provided with a bottom discharge spout 16 in line with a top opening 17.

When plunger 9 has completed a full stroke to the left the measuring chamber 11 registers with the cylinder openings 13 and 14 and with the discharge opening of the funnel 6. Owing to the difference in the effective areas of the openings 13 and 14 the chamber 11 is quickly filled by a portion of the stock dropping from the funnel. During return movement of the plunger the lower end of the measuring chamber, owing to the presence of the baffle 15, is completely closed off slightly before the upper end of the chamber passes completely beyond the opening 13. This ensures complete filling of the chamber 11 by the stock that is trapped therein as the chamber is drawn to the right beyond the openings 13 and 14.

When the plunger 9 reaches the end of its travel to the right chamber 11 registers with the discharge spout 16 which delivers the sample to a subsequently described apparatus where the liquid of the sample is separated from the solid or fibrous constituents.

Plunger 9 is driven by a fluid actuated piston 18 working in a cylinder 19. Pipes 20 and 21 lead from opposite ends of this cylinder to a three way valve 22 which functions to alternately connect said pipes with the fluid supply and drain conduits appearing at 23 and 24. When the valve is in the position shown in Fig. 2 pipe 20 is connected with the supply conduit 23 while pipe 21 is connected with drain pipe 24. When the valve is given a quarter turn from this position the connections of the pipes are reversed.

The mechanism provided for operating valve 22 includes a pair of intermeshing gears 25 and 26 fixed to shafts 27 and 28. These gears carry rollers 29 and 30 adapted to alternately engage the upper end of an intermediately pivoted lever 31. The lower end of this lever carries a roller 32 and is also pivoted to one end of a horizontally slidable link 33. This link slides through a bearing 34 on the base 35 and has its opposite end loosely pivoted to a crank extension 36 fixed to the rotary plug of valve 22. Roller 32 rides the wedge-shaped upper end 37 of a vertically slidable spring-pressed block 38. This block works in a guideway 39 from which its wedge-shaped end is normally projected by springs 40 confined between the lower end of the block and the bottom of the guideway.

During rotation of the gears 25 and 26 in the direction indicated by the applied arrows the upper end of lever 31 is alternately swung in opposite directions by the rollers 29 and 30. When the lever is in the valve operating position shown in Fig. 2 it remains in this position until its upper end is engaged and swung to the right by the roller 29. The resulting travel of the lever roller 32 to the left depresses the block 38 against the resistance of the springs 40 until the axis of the roller passes slightly beyond the apex of the wedge-shaped surface 37. When this occurs the pressure of the springs acts through the block 38 to force the roller 32 to continue its travel to the left to operate the valve 22 to a position reversing the connections of the pipes 20 and 21 with respect to the conduits 23 and 24.

As the gears 25 and 26 continue to rotate in the direction indicated the roller 30 engages and moves the upper end of the lever 31 to the left until the roller 32, which now travels to the right, reaches a point where the pressure of the block 38 becomes effective to return the lever to the valve operating position shown in Fig. 2.

The lever operating rollers 29 and 30 may be adjustably mounted on the gears 25 and 26 so that the instant at which these rollers engage the lever 31 may be varied to change the timing of valve 22. This may be accomplished by mounting the rollers as described in connection with a similar valve operating mechanism disclosed in my co-pending application Serial No. 623,202, filed July 18, 1932. While this particular mounting of the rollers is not shown in the present application it is suggested herein as a convenient expedient for timing the operation of the sample extractor with respect to the operation of the co-acting devices hereinafter referred to.

The apparatus for separating the liquid from the fibrous constituents of each sample will now be described. This apparatus includes an endless foraminous wire 43, similar to the forming wire of a Fourdrinier machine, carried by a pair of main supporting rolls 44 and 45 journalled in the frame structure 46. Between the rolls 44 and 45 the upper flight of the wire passes over a series of table rolls 46a and between the upper and lower squeeze rolls of a press section generally indicated at A. This press section comprises a single large upper roll 47 and two smaller lower rolls 48. A relatively long pan 49 is arranged beneath the portion of the wire which passes over the rolls 46a and 48.

Each sample taken from the conduit 7 is deposited on the wire 43 by the spout 16 of the sample extractor. As the sample flows onto the wire it forms a wet sheet from which a considerable portion of the water drains into the pan 49 during travel of the sheet toward the squeeze rolls of the press section A. As it passes between these rolls a further quantity of water is squeezed from the wet sheet into the pan 49.

The bottom of the pan 49 slopes toward an outlet 50 which delivers the water to a tank 51. A pipe 52 leads from the bottom of this tank to the suction side of a pump 53 driven by an electric motor 54. The pressure side of the pump is connected to one end of a pipe 55 provided, at its opposite ends, with a spray nozzle 56 positioned directly above the opening 17 formed in the cylinder 10 of the sample extractor. Tank 51 is also provided with an overflow outlet 57 through which all of the sample liquid received from the pan 49 is eventually transferred to a metering tank 58 which controls the delivery of the sample liquid to the weighing apparatus as hereinafter explained.

Before taking any samples, the tank 51 is charged with water until the water in this tank and in the spray pipe 55 stands at the level represented by the dotted lines X which is the level of the overflow outlet 57. When the sample extractor is in operation the motor 54 is periodically energized to drive the pump 53 so that the water initially introduced into the tank 51 with, perhaps, some of the sample water from the pan 49, is pumped to the spray nozzle 56 and sprayed downwardly through the measuring chamber 11 each time this chamber is withdrawn to a sample discharging position opposite the cylinder opening 17. The walls of the chamber 11 are thus cleared of any particles of fibre which tend to cling there during the sample discharging operation. After passing through the measuring chamber the water discharged from the spray nozzle 56 is returned to tank 51 via spout 16, wire 43 and pan 49. As soon as the pump 53 comes to rest the water initially charged into the tank 51 again fills the tank to its normal level X with the result that the sample water delivered to the tank during operation of the pump overflows through the outlet 57 into the metering tank 58. It will thus be seen that the initial charging of tank 51 to the level of the overflow outlet 57 enables this tank to serve as a supply reservoir for the flushing nozzle 56 and ensures that all of the sample liquid delivered to said tank will, on stoppage of the pump 53, overflow into the metering tank 58.

The function of the metering tank 58 is to deliver a portion of the liquid derived from each sample to a suitable weighing apparatus hereinafter described, said tank being designed so that the exact quantity of liquid delivered to the weighing apparatus from any particular sample depends upon the total liquid content of the sample which, in turn, obviously depends on the consistency of the main body of stock at the time the sample is taken. Hence, as long as the consistency of the main body of stock passing through the conduit 7 remains constant there will be no change in the total liquid content of succeeding samples and no change in the quantity of liquid delivered to the metering tank 58 from each sample. Consequently, there will be no change in the quantity and weight of the liquid fraction from each sample that is transferred to the weighing apparatus by the metering tank. On the other hand, variations in the consistency of the main body of stock during operation of the pulp or paper making machine will be quickly indicated by a corresponding variation in the weight of the sample liquid delivered to the weighing apparatus by the metering tank.

The manner in which the metering tank is constructed to serve its intended purpose will now be described. As shown more clearly in Figs. 8, 9 and 10, the tank casing is provided with a bottom drain outlet 60 normally closed by a ball valve 61 engaging the valve seat 62. Said casing also contains a vertically adjustable displacement plunger 63 carried at the lower end of an adjusting screw 64 threaded through a bar 65 bridging the upper end of the casing. Plunger 63 is provided with a full length recess 66 opposite a semi-circular slot 67 cut through the wall of the casing. This slot 67 registers with a similar slot 68 cut through the body of a disk 69 which is secured, in a water tight manner, to the outer surface of the casing. A stud 70, projecting from the central portion of disk 69, extends through a central opening in a second disk 71 which is thus supported to have the capacity of rotation relative to the disk 69. When turned to the desired position disk 71 may be clamped in place by the wing nut 72. Disk 71 carries an overflow pipe 73 which, by appropriate turning of the disk, may be raised or lowered to different levels opposite the slots 67 and 68, thus providing an adjustable overflow outlet through which a portion of the liquid from each sample is transferred from the metering tank to the weighing apparatus. At its outer end the pipe 73 is swivelled to a spigot 74 which always hangs in a vertical position.
The sample liquid discharged through the overflow outlet 57 of tank 51 is received in a funnel 75 having a depending stem portion 76 secured in the metering tank within a second full length recess 77 formed in the plunger 63.
The weighing apparatus which receives and weighs the overflow from the metering tank 58 includes a scale beam 79 having its intermediate portion pivoted to the upper end of a hollow standard 80 and provided with a depending pointer 81 adapted to travel over a scale plate 82. Two scale pans 83 and 84 are suspended from the ends of the scale beam by suspension members appearing at 85 and 86. Movement of the scale beam about its pivotal connection with the standard 80 is normally prevented by a horizontal bar 87 having upturned extremities 88 engaging the lower surface of the beam at opposite sides of the beam pivot. Bar 87 works in vertical slots (not shown) formed in the upper portion of standard 80 and is carried at the upper end of a vertical bar 89 slidably housed in said standard. A bracket 90, fastened to the standard 80, carries an intermediately pivoted lever 91 presenting a standard encircling portion 92 that is fastened to the lower end of bar 89 by a pin 93 working in slots 94 (see Figs. 5 and 6). This lever has a counterweight 95 at one end and normally tends to a position holding the bar 87 in restraining engagement with the scale beam. The opposite end of lever 91 is positioned in the path of a member 96 which, as later explained, periodically actuates the lever to a scale beam releasing position against the resistance of the counterweight 95.

The scale pan 83 comprises a wire frame supporting a vertically movable funnel shaped container 97. This container is provided with a bottom discharge opening 98 which, in the lowered position of the container, is closed by a ball valve 99 fixed to the lower end of a vertical valve stem
100. This valve stem extends upwardly through a guide bar 101 spanning the open top of the container and is urged to a valve closing position by a spring 102 confined between the guide bar and an abutment 103 at the upper end of the stem. At suitable intervals the container 97 is raised relative to the scale pan 83 so that the valve 99 is opened against the resistance of the spring 102 by means of a curved member 104 having one end positioned to engage and depress the valve stem abutment 103 when the container is raised. The other end of member 104 is fixed to a vertical pedestal 105 provided with a guideway 106 opposing a similar guideway 107 formed in a companion pedestal 108. These two pedestals serve as guides for a vertically movable cam operated frame 109 by means of which the container 97 is periodically raised and lowered relative to the scale pan 83 to effect opening and closing of the valve 99. As shown herein the cam operated frame comprises vertical side members 110 and 111 working in the pedestal guideways 105 and 106 and having their lower ends connected by a cross bar 113. A bracket 113a, depending from the cross bar 113, carries a roller 114 which rides an operating cam 115 fixed to a shaft 116. The upper ends of the side members 110 and 111 are provided with inward projections 117 adapted to engage outwardly projecting members 118 provided at the top of the container 97.
The side member 111 also carries the previously mentioned lever operating member 96 which, in the lowered position of frame 109, engages and operates the counterweighted lever 119 to lower the retaining bar 87 out of engagement with the scale beam 79.

The scale plate 82 over which the pointer 81 is adapted to travel is carried by the horizontal arm 120 of a vertically disposed L-shaped rod 121. The vertical arm 122 of this rod is pivoted at its upper end to a bracket 123 carried by the standard 80. The arm 122 is normally positioned to hold the scale plate 82 out of contact with the pointer 81. It is intended, however, that the scale plate 82 shall be periodically swung into engagement with the pointer for a purpose hereinafter explained. This may be accomplished by providing the lower portion of the arm 122 with a roller 124 engaging a cam 125 fixed to a shaft 126 journalled in suitable bearings 127.
This shaft is provided at one end with a bevel pinion 128 meshing with a similar pinion 129 on the cam shaft 116. In addition to carrying the previously mentioned cam 115 shaft 116 also carries a cam 130 engaging a roller 131 carried at the lower end of a vertically extending valve rod 132 which is fixed at its upper end to the ball valve 61 which controls the bottom drain outlet 60 of the metering tank 58. One end of shaft 116 carries a bevel pinion 133 meshing with a similar pinion 134 fixed to the shaft 28 previously mentioned in connection with the operating mechanism of the sample extractor. Shaft 28 is provided at the end opposite the valve operating gear 26 with a worm wheel 135 driven by a worm 136 carried at the lower end of a vertical shaft 137. The upper end of shaft 137 carries a bevel pinion 138 meshing with a similar pinion 139 fixed to one end of the shaft 140 which carries the driving roller 45 of the endless wire 43. This shaft 140 is also equipped with a worm wheel 141 driven by a worm 142 fixed to the shaft 143 of the main driving motor 144.

The manner in which the various parts described in the foregoing operate in relation to each other may be briefly reviewed as follows:—

The main driving motor 144 and the various shafts which it drives operate continuously during operation of the pulp or paper making machine with which the invention is associated. The power transmitted from the motor to the intermeshing gears 25 and 26 causes the valve 22 to be operated so that fluid is alternately admitted to opposite ends of the cylinder 19 to effect reciprocation of the piston 18 and the sample extracting plunger 9. Each time the plunger 9 reaches its discharge position over the spout 16 the sample previously extracted from the conduit 7 is deposited on the endless wire 43 which is driven by the roller 45 in the direction indicated by the arrow. As previously explained the liquid is separated from the fibrous constituents of the sample and collected in the pan 49 from whence it is delivered to the tank 51. A drum switch 146 having its movable element fixed to the shaft 28 serves to close a circuit energizing the pump operating motor 54 for a brief period each time the sample extracting plunger 9 is withdrawn to a position where the sample chamber 11 is positioned in line with the discharge spout 16 and the cylinder opening 17. The liquid initially introduced into the tank 51 together with more or less sample liquid of the sample liquid that is being delivered to said tank from the pan 49 is thus pumped to the spray nozzle 56 and downwardly through the chamber 11 to clear the walls of the chamber from adhering fibres. All of this liquid is subsequently returned to the tank 51 via the spout 16 and the collecting pan 49. As soon as the pump 53 comes to rest, as occurs after a relatively brief period of operation due to opening of the switch 146, the water initially charged into the tank 57 assumes its normal level represented by the dotted line X so that all of the sample liquid which has, by this time, been transferred from the pan 49 to the tank 51 is caused to flow through the overflow outlet 57 into the receiving funnel 75 of the metering tank 58. At this time the drain valve 61 of the metering tank is in its closed position. Consequently, the sample liquid delivered to the metering tank rises therein until a certain portion of this liquid, depending upon the total quantity of liquid received from the tank 51, overflows through the pipe 73 and spigot 74 into the receiving end of a pipe 147 which conducts the overflow to the container 97 of the weighing apparatus. At this time the container 97 is in the lowered position shown in Fig. 7 so that the valve 99 is held closed by the spring 102 to trap the liquid therein.

Since the cam operated frame 109 is also in its lowered position at this time the counterweighted lever 91 is held, by its operating member 96, in a position permitting the scale beam 79 to tilt in response to the weight of the liquid deposited in the container 97, the weight of the liquid in the container being thus indicated by movement of the pointer 81 relative to the scale plate 82. After a suitable interval following deposit of the liquid in the container 97 the cam 115 operates to raise the frame 109 and the container 97 to the position shown in Fig. 5. When the container 97 is elevated to this position the valve 99 is opened by engagement of the member 104 with the abutment 103 at the upper end of the valve stem 100, thus permitting the container to be quickly emptied of its liquid contents.

Shortly after the overflow from the metering tank 58 ceases the cam 130 operates the valve rod 132 to open the drain valve 61 and thus permit escape of the liquid trapped below the overflow pipe 73. This emptying of the metering tank is timed to occur at a suitable interval following each charging of the tank with liquid extracted from a particular sample and prior to supplying the metering tank with liquid derived from a succeeding sample. In other words, the liquid extracted from each sample is delivered to the metering tank after this tank has been emptied of the liquid received from a previous sample. Likewise the container 97 of the weighing apparatus is also relieved of the liquid received from one sample before being supplied with liquid extracted from a subsequent sample.

From the foregoing discussion it will be seen that the quantity and weight of the liquid delivered to the weighing pan 97 from each sample are determined by the total quantity of liquid that is obtained from the sample and delivered to the metering tank 58 via the pan 49 and the flushing tank 51 and this, in turn, is determined by the consistency of the main body of stock at the time the sample is taken. Consequently, any variations occurring in the consistency of the main body of stock causes similar variations in the quantity of liquid delivered to the weighing apparatus and are readily noted by observing the resulting movement of the pointer 81 relative to the scale pan 82.

In the use of this invention it is, of course, necessary to counterweight the weighing apparatus so that variations in the consistency of the stock may be noted and corrected in accordance with a definite predetermined standard. To this end a counterweight 149 is placed on the scale pan 84 to balance the weight of the liquid that is delivered to the weighing container 97 at a time when the consistency of the main body of stock is at the desired value. Consequently, any variations in the weight of the liquid charges delivered to the weighing container 97 from subsequently extracted samples will be immediately indicated by movement of the pointer 81 in one direction or the other dependent upon whether the weight of the sample liquid deposited in the container 97 exceeds or is less than that of the balancing counterweight on the scale pan 84. The operator, being thus advised that the consistency of the diluted stock going to the stock chest is above or below the desired standard, may take immediate steps to correct this condition by regulating the water supply valve which controls the dilution of the stock.

When, through a change in the consistency of the main body of stock, the weight of the sample liquid deposited in the weighing container 97 varies from the standard established by the counterweight 149 the resulting movement of the pointer 81 may be utilized for regulating the water supply valve to correct the undesirable increase or decrease in the stock consistency indicated by this movement of the pointer. One method of accomplishing this is indicated in Figs. 11 to 15 inclusive. As diagrammatically shown in Fig. 11 the scale pointer controls the actuation of a reversing switch B and a motor line switch C which, in turn, control the operation of a motor D that is connected to operate the water supply valve (not shown) in a well known manner. The reversing switch B is of the magnetic type in which the movable contacts are carried by a solenoid core E which is adapted to travel in either direction under the influence of the solenoid coils F and G, each of which has one terminal connected to a supply lead H. The remaining terminals of these coils F and G are respectively connected to contacts I and J carried by the scale plate 82 over which the scale pointer travels.

The motor line switch C is of the multi-drum type as shown in detail in Fig. 12 to 14 inclusive. It includes a shaft 191 rotatably mounted in suitable standards 192 and equipped at one end with an escapement mechanism including a toothed wheel 193 fixed to rotate with the shaft 191 and meshing with a smaller toothed wheel 194 fixed to rotate with an upper shaft 195 mounted in any suitable form of bearing structure generally indicated at 196. Shaft 195 also carries a ratchet wheel 197 co-acting with an escapement ratchet 197a fixed to the upper end of a pendulum 198 hung from a suitable support 198a.

Shaft 191 also carries a plurality of fixed ratchet wheels indicated at 199. Each ratchet wheel 199 is adapted to be engaged by a spring pressed pawl 200 carried by an associated lever 201. The levers 201 are loosely pivoted at one end on the shaft 191 and have their opposite ends secured by pin and slot connections 202 to the upper extremities of a series of solenoid cores designated 203, 204 and 205, the movements of which are controlled by the associated solenoid coils 203a, 204a and 205a. The solenoid cores 203, 204 and 205 are provided with stops 206, 207 and 208 arranged so that each core has a different length of travel as compared with the companion cores. When any one of the solenoid coils 203a, 204a and 205a is energized, the outer end of the associated lever 201 is raised a definite distance and the pawl carried by said lever engages with a tooth of the associated ratchet wheel 199 when the lever reaches the end of its upward travel. When the solenoid coil is deenergized the lever 201 gradually descends to its original position at a speed controlled by the escapement mechanism associated with the shaft 191. The shaft end of each lever 201 is fixed to a drum 210 which is also loosely mounted on the shaft 191. This drum carries a contact 211 adapted, when the drum is alternately rotated in opposite directions, to move into and out of engagement with a co-operating stationary contact 212 mounted on any suitable form of support indicated at 213. When each drum 210 is rotated by the upward movement of its operating lever 201 the contact 211 engages the contact 212 and closes the gap in the motor supply circuit which appears at 214 in Fig. 11. When the solenoid by which each lever 201 is raised is deenergized the lever falls slowly under the control of the escapement mechanism until the contact 211 moves out of engagement with the contact 212, the length of time which these contacts are engaged being controlled by the stroke of the lever operating solenoid core which is predetermined by the stop associated with said core. As shown to advantage in Fig. 11 one terminal of each of the solenoid coils 203a, 204a and 205a is connected by a lead supply line K to the remaining terminal of the supply source to which the reversing switch coils F and G are connected as previously described. The remaining terminals of the solenoid coils 205a, 204a and 203a are connected, as shown in Fig. 11 to contacts A, A', B, B', C, C' carried by the scale plate 82. As herein shown the contacts A, B and C are grouped directly opposite the contact I at one side of the center of the scale plate 82 and the contacts A', B' and C' are grouped at the opposite side of the transverse center of the scale plate directly opposite the contact J.

Assuming that the pointer 81 is moved to the right a distance merely sufficient to connect the contact I with the contact A this serves to energize the solenoid coil 205a of the motor line switch and causes the contacts 211 and 212 controlled by this solenoid to close the gap 214 in the motor supply line for a predetermined period. At the same time the solenoid coil F of the motor reversing switch B is energized to move the solenoid E in one direction so as to determine the direction of rotation of the motor D. Similarly if the pointer 81 is moved to the left only a distance sufficient to connect the contact J with the contact A' the solenoid coil 205a of the motor line switch is energized as previously described but in this case the coil G instead of the coil F becomes the energized coil of the motor reversing switch B and causes the motor D to operate in the reverse direction. When the limit of movement of the pointer 81 is such as to connect the contact I with the contact B or with the contact C, or is such as to connect the contacts J with the contacts B' and C', the solenoid coils 204a or 203a as the case may be are energized in a similar manner to that described in connection with the solenoid coil 205a to regulate the length of time which the motor D is caused to operate by closure of the gap 214.

The scale pointer 81 swings freely during the weighing of the sample liquid until it reaches the end of its travel and comes to rest. It is then engaged by the scale plate 82 which is moved towards the pointer by its previously mentioned operating cam 125.

Having thus described my invention, what I claim is:—

1. Apparatus for indicating the consistency of the pulp stock supplied to a pulp or paper making machine, comprising means for extracting a sample from the main body of stock, a weighing apparatus, and means for delivering liquid from the sample to the weighing apparatus so that the quantity of liquid thus supplied to the weighing apparatus is determined by the consistency of the main body of stock at the time the sample is taken.

2. Apparatus for indicating the consistency of the pulp stock supplied to a pulp or paper making machine, comprising means for periodically extracting samples from the main body of diluted stock, means for separating the liquid from the fibrous constituents of the sample in such manner that the quantity of liquid derived from each sample is determined by the consistency of the main body of stock at the time the sample is taken, a weighing apparatus, and means for delivering liquid from each sample to the weighing apparatus so that the quantity of liquid received by the weighing apparatus from any particular sample is also determined by the consistency of the main body of stock at the time the sample is taken.

3. Apparatus for indicating the consistency of the pulp stock supplied to the stock chest of a pulp or paper making machine, comprising means for periodically extracting samples from the main body of diluted stock in such manner that the liquid content of each sample is determined by the consistency of the main body of stock at the time the sample is taken, means for separating the liquid from the fibrous constituents of each sample so that the amount of liquid thus obtained is determined by the total liquid content of the sample, a weighing apparatus, means for delivering liquid from each sample to said weighing apparatus and means for regulating the quantity of liquid delivered to the weighing apparatus from each sample according to the total amount of liquid derived from said sample.

4. Apparatus as claimed in claim 3 in which the weighing apparatus is counterweighted to just balance the weight of the liquid delivered thereto from a sample taken at a time when the consistency of the main body of diluted stock is at the desired value.

5. Apparatus for indicating the consistency of the pulp stock delivered to a pulp or paper making machine comprising means for periodically extracting constant volume samples from the main body of diluted stock so that the total liquid content of each sample is determined by the consistency of the stock at the time the sample is taken, means for separating the liquid from the fibrous constituents of each sample so that the quantity of liquid thus obtained is a variable factor determined by the total liquid content of the sample, a metering tank to which all the liquid derived from each sample is delivered, said tank having an overflow outlet through which a portion of such liquid, determined by the total quantity supplied to the tank, is permitted to escape, and a weighing apparatus arranged to receive and weigh the overflow from said tank.

6. Apparatus for indicating and regulating the consistency of the pulp stock supplied to a pulp or paper making machine comprising means for periodically extracting constant volume samples from the main body of diluted stock so that the liquid content of each sample is determined by the consistency of the stock at the time the sample is taken, means for separating the liquid from the fibrous constituents of the samples so that the quantity of liquid thus derived from each sample is determined by its total liquid content, a liquid weighing apparatus, means for delivering liquid from the samples to said weighing apparatus in such manner that the exact quantity of liquid received by the weighing apparatus from any particular sample is a variable factor dependent upon the total quantity of liquid derived from such sample, said weighing apparatus being counterweighted to just balance the weight of the liquid received from a sample taken at a time when the consistency of the main body of stock is at the desired value, and means including said weighing apparatus for automatically regulating the water supply valve to correct undesirable changes in the stock consistency indicated at the weighing apparatus by the delivery thereto of a weight of sample liquid that exceeds or is less than the value of the balancing weight.

7. Apparatus for indicating the consistency of the pulp stock supplied to a pulp or paper making machine comprising a sample extractor functioning to periodicaly extract samples of constant volume from the main body of stock and indicating means to which the samples are delivered by the sample extractor, said indicating means functioning to indicate changes in the liquid content of succeeding samples reflecting corresponding changes in the consistency of the main body of stock.

8. Apparatus for indicating and regulating the consistency of the pulp stock supplied to a pulp or paper making machine comprising a sample extractor functioning to periodically extract samples of constant volume from the main body of diluted stock, means receiving the samples from the sample extractor and functioning to indicate changes in the liquid content of succeeding samples reflecting corresponding changes in the consistency of the stock and means, actuated by said last mentioned means, for operating the water supply valve to regulate the consistency of the stock when the liquid content of a sample varies from a predetermined standard.

9. Apparatus for indicating and regulating the consistency of the pulp stock supplied to a pulp or paper making machine comprising, in combination, means for periodically extracting samples of constant volume from the main body of stock, indicating means operable in response to changes in the liquid content of succeeding samples reflecting similar changes in the consistency of the main body of stock, a motor for operating the water supply valve controlling the dilution of the stock, and means, controlled by said indicating means, for operating the motor to increase or decrease the dilution of the stock according to changes in the liquid content of the samples delivered to said indicating means.

10. Apparatus of the character described comprising, in combination, means for periodically extracting samples of constant volume from the main body of diluted stock supplied to a pulp or paper making machine, means for indicating changes in the liquid content of succeeding samples reflecting corresponding changes in the consistency of the main body of stock, a motor for operating the water supply valve controlling the dilution of the stock, and means for governing the operation of the motor so that the regulation of the water supply valve is determined by the liquid content of the samples.

11. Apparatus for indicating the consistency of the pulp stock supplied to a pulp or paper making machine comprising a sample extractor for periodically extracting samples from the main body of diluted stock, means for separating the liquid from the fibrous constituents of each sample comprising a travelling filter to which the samples are successively delivered by the sample extractor, a weighing apparatus to which a quantity of the liquid extracted from each sample is delivered and means for controlling the delivery of sample liquid to the weighing apparatus so that the quantity of liquid received by the weighing apparatus from any particular sample is determined by the total amount of liquid derived from said sample.

RUSSELL CARPENTER.